(12) United States Patent
Miyasaka

(10) Patent No.: US 8,393,670 B2
(45) Date of Patent: Mar. 12, 2013

(54) CAB STOPPER DEVICE FOR WORK MACHINE, METHOD FOR FIXING THE CAB STOPPER AND CAB OF WORK MACHINE

(75) Inventor: Shuuji Miyasaka, Ibaraki (JP)

(73) Assignee: Komatsu Ltd. (JP)

(*) Notice: Subject to any disclaimer, the term of this patent is extended or adjusted under 35 U.S.C. 154(b) by 0 days.

(21) Appl. No.: 13/541,870

(22) Filed: Jul. 5, 2012

(65) Prior Publication Data

US 2012/0274097 A1 Nov. 1, 2012

Related U.S. Application Data

(62) Division of application No. 12/866,378, filed as application No. PCT/JP2009/057443 on Apr. 13, 2009, now Pat. No. 8,246,107.

(30) Foreign Application Priority Data

Apr. 25, 2008 (JP) .................................. 2008-115640

(51) Int. Cl.
*B60J 7/00* (2006.01)
(52) U.S. Cl. ................................. 296/190.03
(58) Field of Classification Search ............. 296/190.03, 296/187.01, 190.01, 190.04, 190.07, 35.1
See application file for complete search history.

(56) References Cited

U.S. PATENT DOCUMENTS

| | | | | |
|---|---|---|---|---|
| 7,246,846 B2 * | 7/2007 | Shioji et al. | ............. | 296/190.11 |
| 7,364,223 B2 * | 4/2008 | Mori et al. | ............. | 296/190.07 |
| 7,828,371 B2 * | 11/2010 | Murakami | ............. | 296/190.03 |
| 7,938,478 B2 * | 5/2011 | Kamimae | ............. | 296/190.08 |
| 7,950,726 B2 * | 5/2011 | Brown | ............. | 296/190.07 |
| 8,087,718 B2 * | 1/2012 | Bengtsson et al. | ....... | 296/190.07 |
| 8,091,954 B2 * | 1/2012 | Blin et al. | ............. | 296/190.01 |
| 2004/0245806 A1 * | 12/2004 | Mori et al. | ............. | 296/187.03 |
| 2006/0071499 A1 * | 4/2006 | Yoon | ............. | 296/35.1 |
| 2007/0278811 A1 * | 12/2007 | Derham et al. | ............. | 296/35.1 |
| 2008/0157565 A1 * | 7/2008 | Bakshi | ............. | 296/190.07 |
| 2009/0085377 A1 * | 4/2009 | Hayes et al. | ............. | 296/190.07 |
| 2009/0167057 A1 * | 7/2009 | Walter et al. | ............. | 296/190.03 |
| 2009/0289472 A1 * | 11/2009 | Catanzarite et al. | ..... | 296/190.07 |
| 2009/0314101 A1 * | 12/2009 | Kamimae | ............. | 248/276.1 |
| 2011/0025097 A1 * | 2/2011 | Yamamoto et al. | ...... | 296/190.03 |
| 2011/0135434 A1 * | 6/2011 | Yoon | ............. | 414/694 |

FOREIGN PATENT DOCUMENTS

| | | |
|---|---|---|
| JP | 2-81284 | 6/1990 |
| JP | 10-204924 | 8/1998 |
| JP | 2002-339406 | 11/2002 |
| JP | 2007-162234 | 6/2007 |
| JP | 2007-182698 | 7/2007 |
| WO | 2008/066108 A1 | 6/2008 |

* cited by examiner

*Primary Examiner* — Kiran B Patel
(74) *Attorney, Agent, or Firm* — Fox Rothschild LLP

(57) ABSTRACT

A cab stopper device 32 is provided between a bracket 23 on a machine frame of a work machine and a cab 25. The cab stopper device 32 restricts relative movement of the cab 25 with respect to the machine frame in the vertical direction. Two through holes 43, 44 are formed in a floor plate 27 of the cab 25. A stopper 48 of the cab stopper device 32 is inserted in the through holes 43, 44 from above. An engaging portion 48a is formed at the lower end of the stopper 48 that projects from the through holes 43, 44 downward of the floor plate 27. The engaging portion 48a is arranged to be engageable with a restricting groove 42 formed in the bracket 23. In this state, a securing portion 48b at the upper end of the stopper 48 is secured to the floor plate 27.

7 Claims, 10 Drawing Sheets

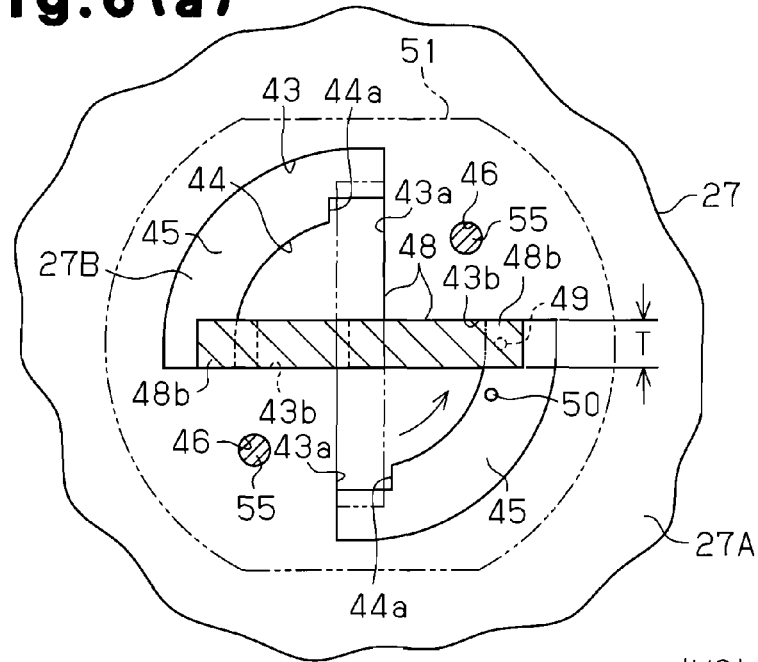
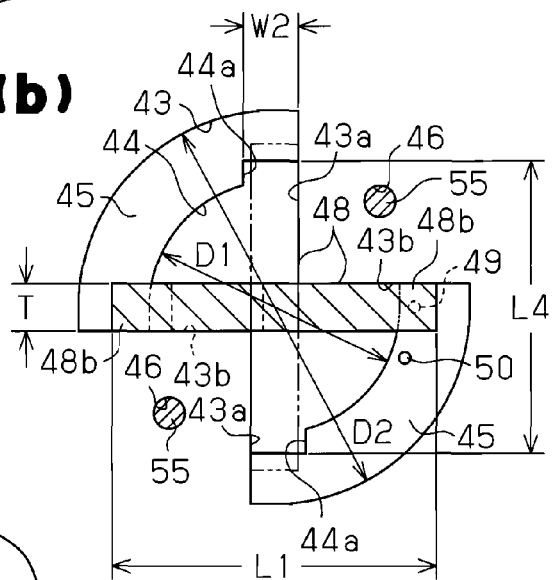
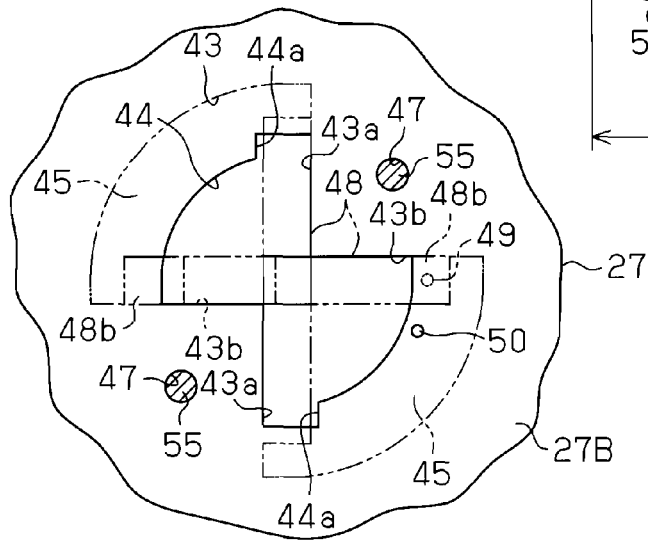

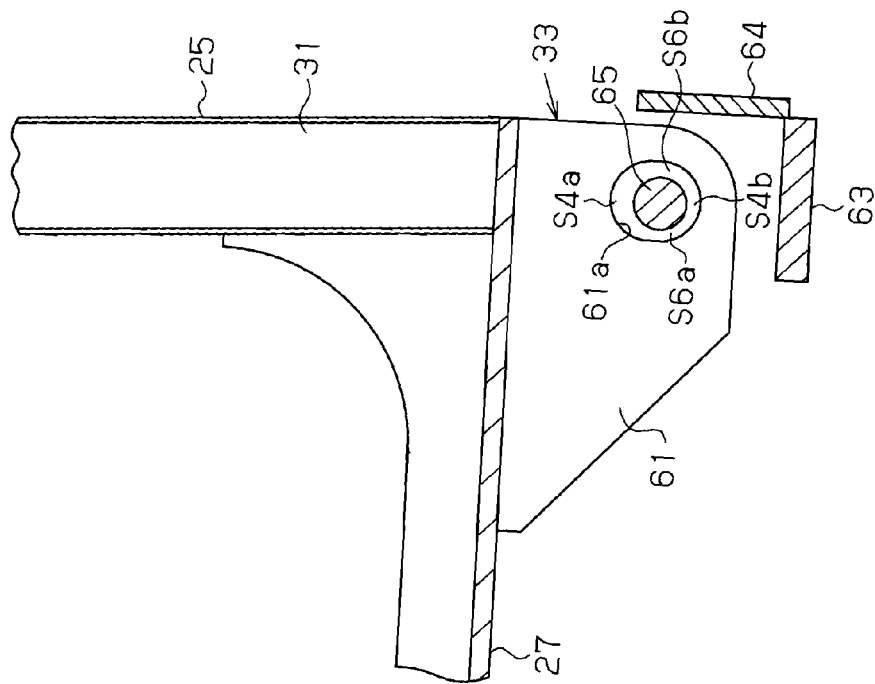
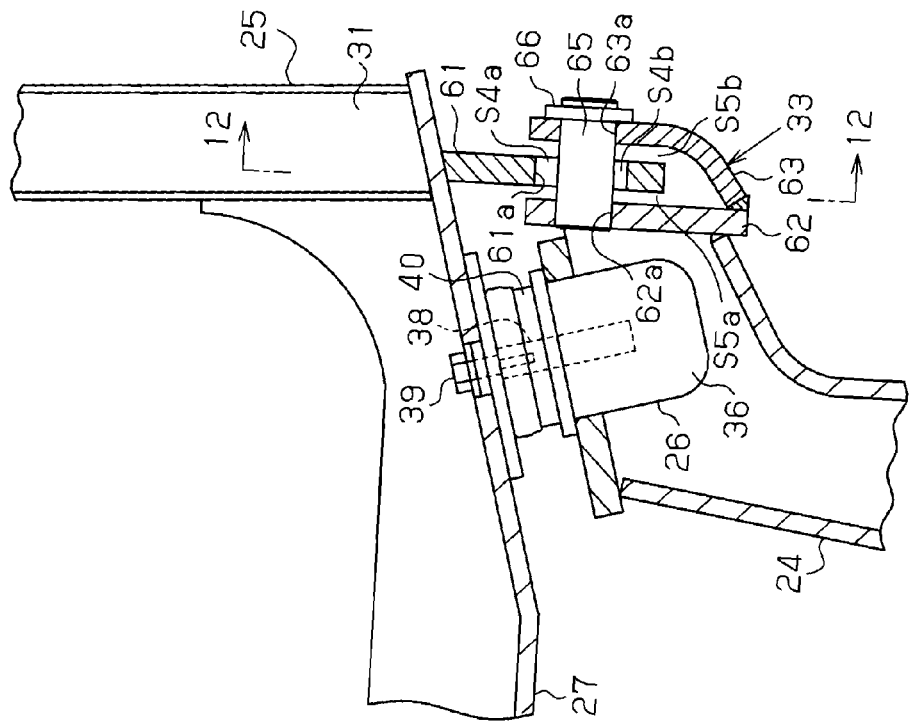

CAB STOPPER DEVICE FOR WORK MACHINE, METHOD FOR FIXING THE CAB STOPPER AND CAB OF WORK MACHINE

CROSS REFERENCE TO RELATED APPLICATIONS

This application is a divisional application of prior application Ser. No. 12/866,378, filed Aug. 5, 2010, which is a National Phase Application of International Application PCT/JP2009/057443 filed on Apr. 13, 2009, which claims priority to Japanese Patent Application No. 2008-115640, filed Apr. 25, 2008, all of which applications are hereby incorporated by reference herein.

FIELD OF THE INVENTION

The present invention relates to a cab stopper device for a work machine, a method for fixing a cab stopper, and a cab for a work machine. A cab stopper device is located between a bracket on a machine frame and the cab of a work machine such as a bulldozer and a hydraulic shovel. The cab stopper device restricts the cab from excessively moving relative to the machine frame when, for example, the work machine rolls over.

BACKGROUND OF THE INVENTION

One type of a cab stopper device proposed for work machines, for example, is the structure disclosed in Patent Document 1. In this conventional device, a block-like stopper member is fixed to a side portion of the cab. A receiving member is secured to the machine frame and projects from the frame. The receiving member includes an engaging recess, which is engageable with the stopper member. The stopper member faces the inner surface of the engaging recess, and a clearance is formed between the stopper member and the inner surface of the engaging recess. According to this structure, when the cab moves relative to the machine frame, the engagement between the stopper member and the receiving member inhibits the cab from moving relative to the machine frame by an amount more than or equal to a predetermined distance.

Patent Document 1: Japanese Laid-Open Patent Publication No. 2007-162234

DISCLOSURE OF THE INVENTION

Problems that the Invention is to Solve

As described above, in the conventional apparatus of Patent Document 1, the stopper member is secured to the side portion of the cab, and the receiving member, which is engageable with the stopper member, is secured to the machine frame to project from the machine frame. However, the structure for securing the stopper member to the cab is not disclosed in Patent Document 1. In order to secure the block-like stopper member to the side portion of the cab, it is necessary to prevent contact between the stopper member and the receiving member, and to ensure the mounting strength of the stopper member. Thus, the mounting structure of the stopper member is undesirably complicated.

Furthermore, two opening portions are formed at a portion adjacent to the engaging recess in the above-mentioned receiving member. The stopper member is inserted from the opening portions, and faces the inner surface of the engaging recess. That is, in the conventional cab stopper device, the stopper member cannot restrict the movement of the cab in the directions in which the stopper member is disengaged from the two opening portions. Patent Document 1 discloses an example in which the stopper member and the engaging portion are formed into a cross figure and a T-shape. In this case also, one opening portion is formed. Thus, the stopper member cannot restrict the movement of the cab in the direction in which the stopper member is disengaged from the opening portion.

The objective of the present invention is to provide a cab stopper device for work machine, a method for fixing the cab stopper, and a cab for a work machine. The cab stopper device has a simple structure, is easily fixed, and restricts the movement in the vertical, left-right, and front-rear directions.

Means for Solving the Problems

To achieve the above objective, the present invention provides a cab stopper device provided between a restricting portion provided on a machine frame of a work machine and a cab of the work machine. The device is characterized by a through hole and a stopper. The through hole is formed in a floor plate of the cab. The stopper is inserted in the through hole from above. The stopper includes an engaging portion at its lower end that projects downward from the through hole. The engaging portion is engageable with the restricting portion. The relative position of the through hole and the stopper is changeable between an inserting position, at which the stopper is insertable in the through hole with the engaging portion not contacting the restricting portion, and an engaging position, at which the engaging portion is engageable with the restricting portion with the stopper inserted in the through hole.

The cab stopper device of the present invention employs a simple structure in which the engaging portion, which is engageable with the restricting portion of the machine frame, is formed at the lower end portion of the stopper. Thus, the structure of the cab stopper device is simplified. The stopper is fixed by a simple operation. That is, when fixing the stopper, the stopper is inserted in a hole in the floor plate of the cab from above so that the lower end portion of the stopper is engageable with the restricting portion of the bracket. Then, the upper end portion of the stopper is secured to the floor plate. Thus, even if various operation devices are mounted on the machine frame in the vicinity of the cab stopper device, the stopper is easily fixed from above the floor plate of the cab. The description that the engaging portion of the stopper is engageable with the restricting portion means that the engaging portion of the stopper faces the restricting portion through a clearance, and when the cab, that is, when the stopper moves relative to the machine frame, the engaging portion engages with the restricting portion.

Furthermore, the stopper can be arranged between the cab and the machine frame after the cab is mounted on the machine frame. Thus, different stoppers for restricting the movement of the cab in the vertical, left-right, and front-rear directions are easily fixed.

The upper end portion of the stopper is preferably fixed on the upper surface of the floor board in a state where the relative position of the through hole and the stopper corresponds to the engaging position.

When the stopper is rotated about a vertically extending axis after being inserted in the through hole, the relative position between the through hole and the stopper is preferably shifted from the inserting position to the engaging position.

The floor plate preferably has an inhibiting portion for inhibiting the stopper located at the engaging position from moving downward.

The device preferably employs the following structure. The upper end portion of the stopper includes a securing portion, which projects to the side of the stopper. The through hole includes an upper through hole formed in the upper surface of the floor plate and a lower through hole formed in the lower surface of the floor plate. The lower through hole has a smaller dimension than the upper through hole. The inhibiting portion is formed on the periphery of the lower through hole. The inhibiting portion serves as a support surface, which contacts the securing portion of the stopper and supports the stopper.

When the stopper is rotated about the vertically extending axis after being inserted in the through hole, the inhibiting portion desirably inhibits the stopper from moving downward.

The floor plate and the stopper are respectively provided with marks, which match each other when the direction in which the stopper is mounted with respect to the floor plate is correct. Thus, the stopper is prevented from being fixed in an erroneous manner.

It is preferable to form the stopper with plate material in view of the productivity.

A cover plate is preferably provided that is secured to the floor plate in a state where the cover plate covers the upper end portion of the stopper. The cover plate inhibits the movement of the stopper in a state where the relative position between the through hole and the stopper is at the engaging position.

It is desirable to provide shock absorbing means between the stopper and the cover plate in view of, for example, absorbing vibration.

Furthermore, in view of the sealing performance, it is preferable to provide sealing means between the cover plate and the floor plate for sealing between the cover plate and the floor plate.

A cab mounted on a machine frame of work machine. A cab stopper device including a stopper is located between the cab and a restricting portion provided on the machine frame. The cab is characterized by a floor plate arranged at the lower part of the cab, and a through hole formed in the floor plate of the cab. The stopper is inserted downward in the through hole from above the floor plate. The relative position of the through hole and the stopper is changeable between an inserting position, at which the stopper is insertable in the through hole while not contacting the restricting portion, and an engaging position, at which the stopper is engageable with the restricting portion while being inserted in the through hole.

Furthermore, the present invention provides a method for fixing a cab stopper device. The cab stopper device is provided between a restricting portion provided on a machine frame of a work machine and a cab of the work machine. The method is characterized by: mounting the cab on the machine frame; inserting a stopper in a through hole formed in a floor plate of the cab from above with the stopper not contacting the restricting portion; changing the stopper from a state in which the stopper does not contact the restricting portion to a state in which the lower end of the stopper is engageable with the restricting portion after inserting the stopper into the through hole; and securing the upper end portion of the stopper to the floor plate.

In this manner, the structure of the cab stopper device is simplified, and the stopper, which restricts the movement of the cab in the different directions, is fixed on the floor plate of the cab from the upper side easily.

Effects of the Invention

As described above, according to the present invention, the deflection of the cab is inhibited in all directions with a simple structure, and the stopper is easily fixed on the floor plate of the cab from the upper side.

BRIEF DESCRIPTION OF THE DRAWINGS

FIG. 6(a) is a partial cross-sectional view taken along line 6-6 of FIG. 5;

FIG. 6(b) is a partial cross-sectional view mainly illustrating the upper through hole;

FIG. 6(c) is a partial cross-sectional view mainly illustrating the lower through hole;

FIG. 11 is a partial cross-sectional view taken along line 11-11 of FIG. 9; and

FIG. 12 is a partial cross-sectional view taken along line 12-12 of FIG. 11.

DETAILED DESCRIPTION OF THE INVENTION

One embodiment of the present invention will now be described with reference to drawings.

Figure 1:
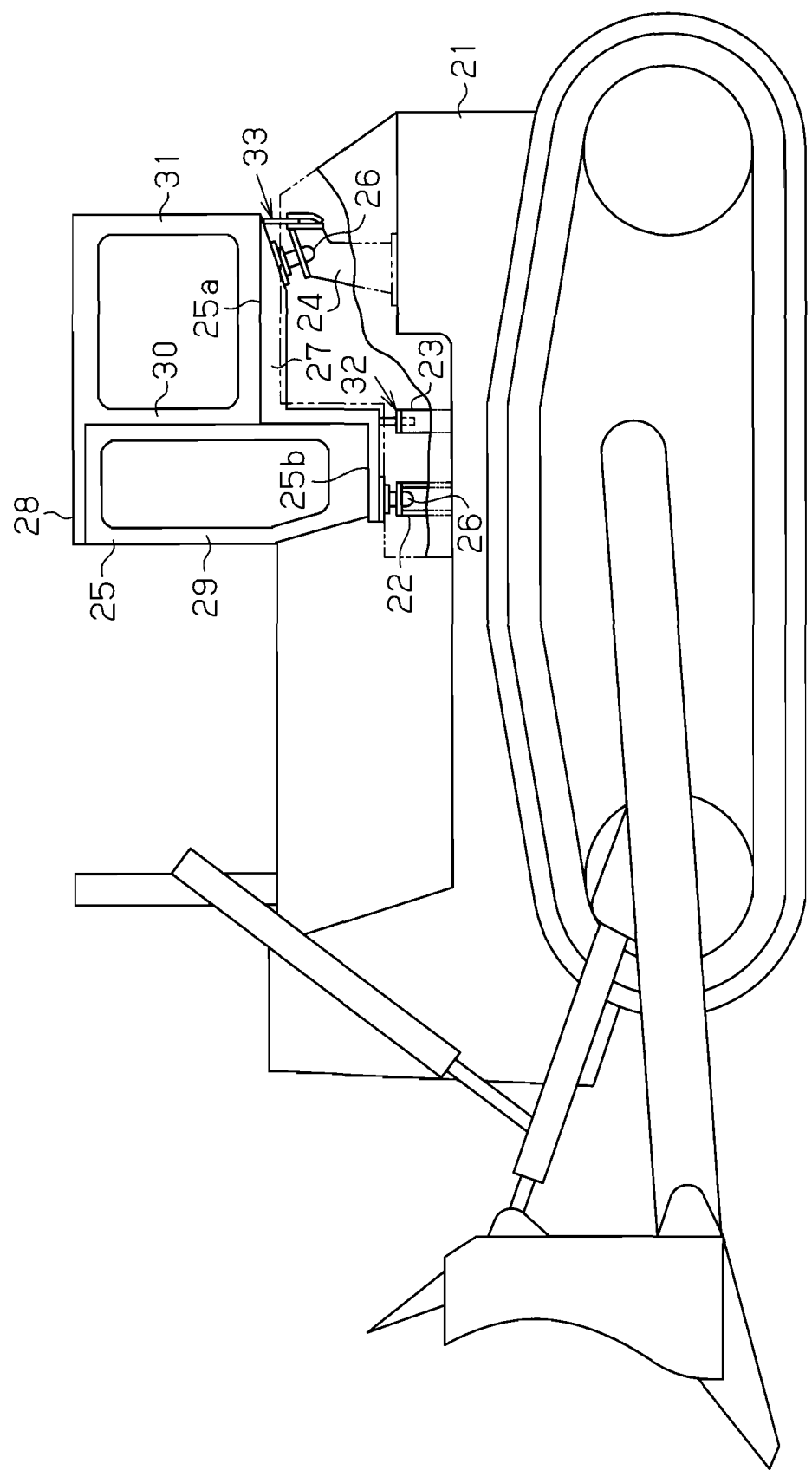
FIG. 1 is a side view illustrating a work machine to which a cab stopper device of the present invention is applied, which is a bulldozer.

As shown in FIG. 1, a work machine, which is a bulldozer in the present embodiment, includes a machine frame 21. A pair of front brackets 22, a pair of middle brackets 23, and a pair of rear brackets 24 are fixed on the upper portion of the machine frame 21 on both the left and right sections of the machine frame 21. The brackets 22, 23, 24 are formed of metal, and are arranged on the machine frame 21 at predetermined intervals in the front-rear direction and the left-right direction. A cab 25 is supported by the front brackets 22 and the rear brackets 24 with dampers 26. The dampers 26 function as anti-vibration mounts. When the bulldozer is travelling, vibrations and impact that act on the machine frame 21 are damped and moderated by the dampers 26.

The cab 25 includes a floor plate 27 and a ceiling board 28. The cab 25 is of a type in which the rear part is supported at a higher position. That is, a rear part 25a of the floor portion is higher than a front part 25b. A pair of front pillars 29, a pair of middle pillars 30, and a pair of rear pillars 31 are arranged on the floor plate 27 on both the left and right sections of the floor plate 27. The pillars 29, 30, 31 support the ceiling board 28. If the bulldozer rolls over, most of the impact load that is applied to the cab 25 is received by the rear part of the cab 25. That is, an excessive impact load tends to be applied to the rear part of the cab 25 when the bulldozer rolls over.

Figure 9:
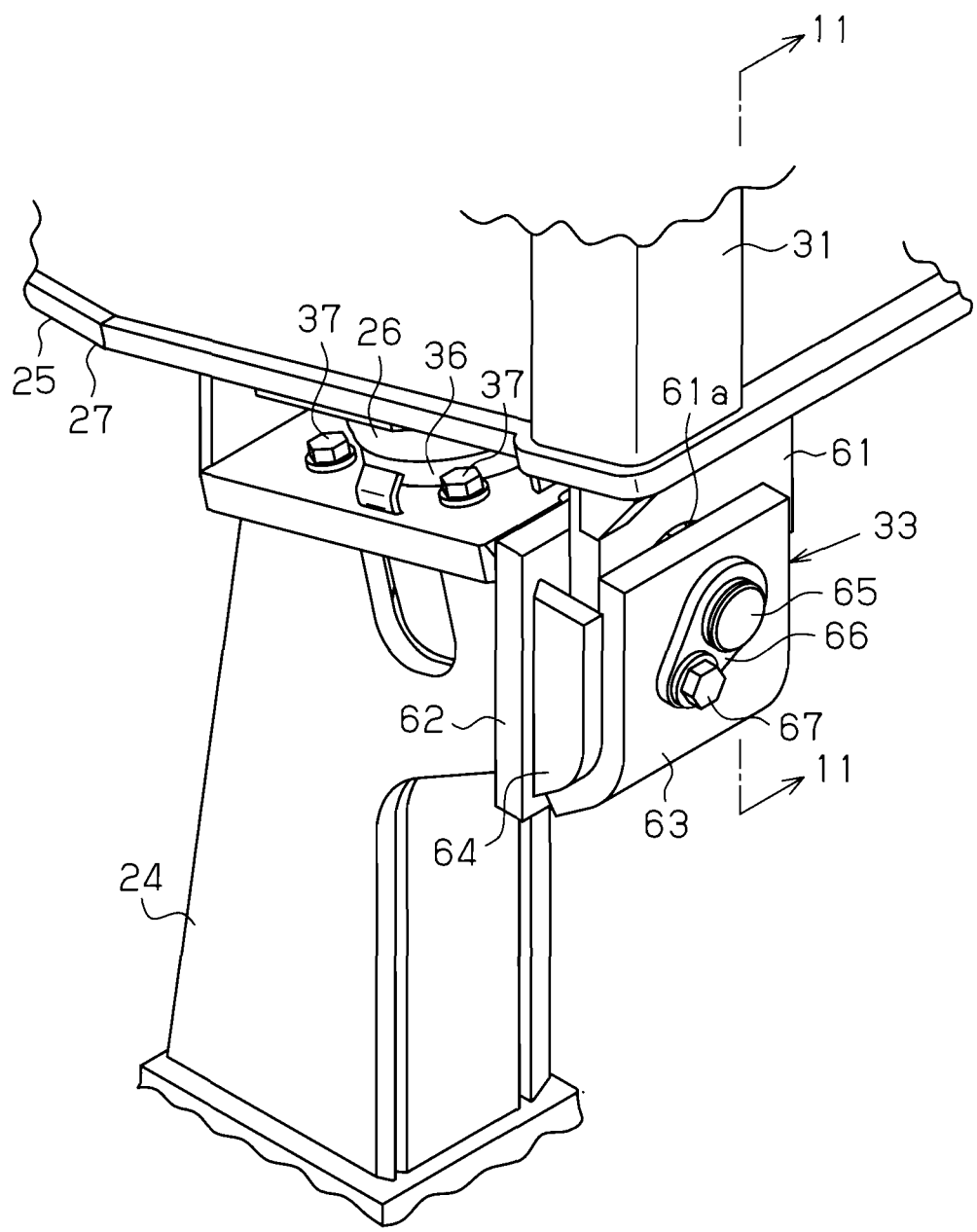
FIG. 9 is an enlarged perspective view of the essential part illustrating the rear cab stopper device of the cab of the bulldozer shown in FIG. 1.

Since the rear dampers 26 and the front dampers 26 have almost the same structure, the rear dampers 26 and the mounting structure of the rear dampers 26 will be described in detail, and the explanation of the front dampers 26 is omitted. As shown in FIGS. 9 and 11, each of the rear dampers 26 includes a case 36. The case 36 is fixed to the associated rear bracket 24 on the machine frame 21 by bolts 37. A stud 38, which projects in the case 36, is secured to the lower surface of the floor plate 27 of the cab 25 by a bolt 39 as shown in FIGS. 9 and 11. A shock absorbing member 40 formed of elastic material such as rubber is arranged between each case 36 and the associated stud 38. The case 36 is filled with non-illustrated high-viscosity damping liquid such as silicone oil.

If vibrations or impact are applied to the machine frame 21 when the bulldozer is travelling, the stud 38 of each damper 26 is moved in the vertical, front-rear, and left-right directions relative to the associated case 36. The relative movement causes the shock absorbing member 40 to be elastically deformed between the case 36 and the stud 38. Accordingly, the damping liquid flows in the case 36, and flow resistance of the damping liquid is generated. Such elastic deformation and flow resistance operate together, and damp and moderate the vibrations and impact transmitted to the cab 25.

Figure 2:
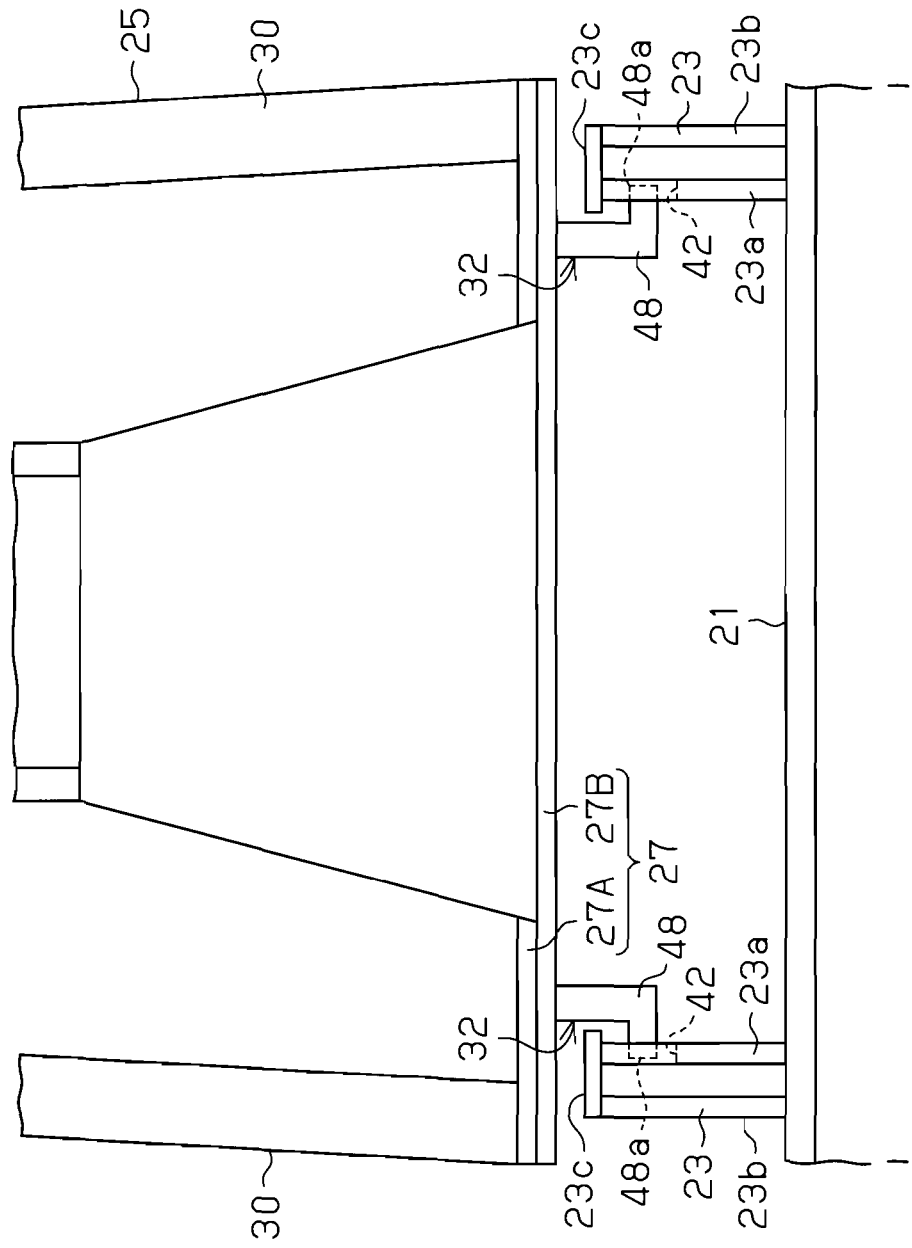
FIG. 2 is an enlarged front view illustrating a front cab stopper device of the bulldozer of FIG. 1.
Figure 3:
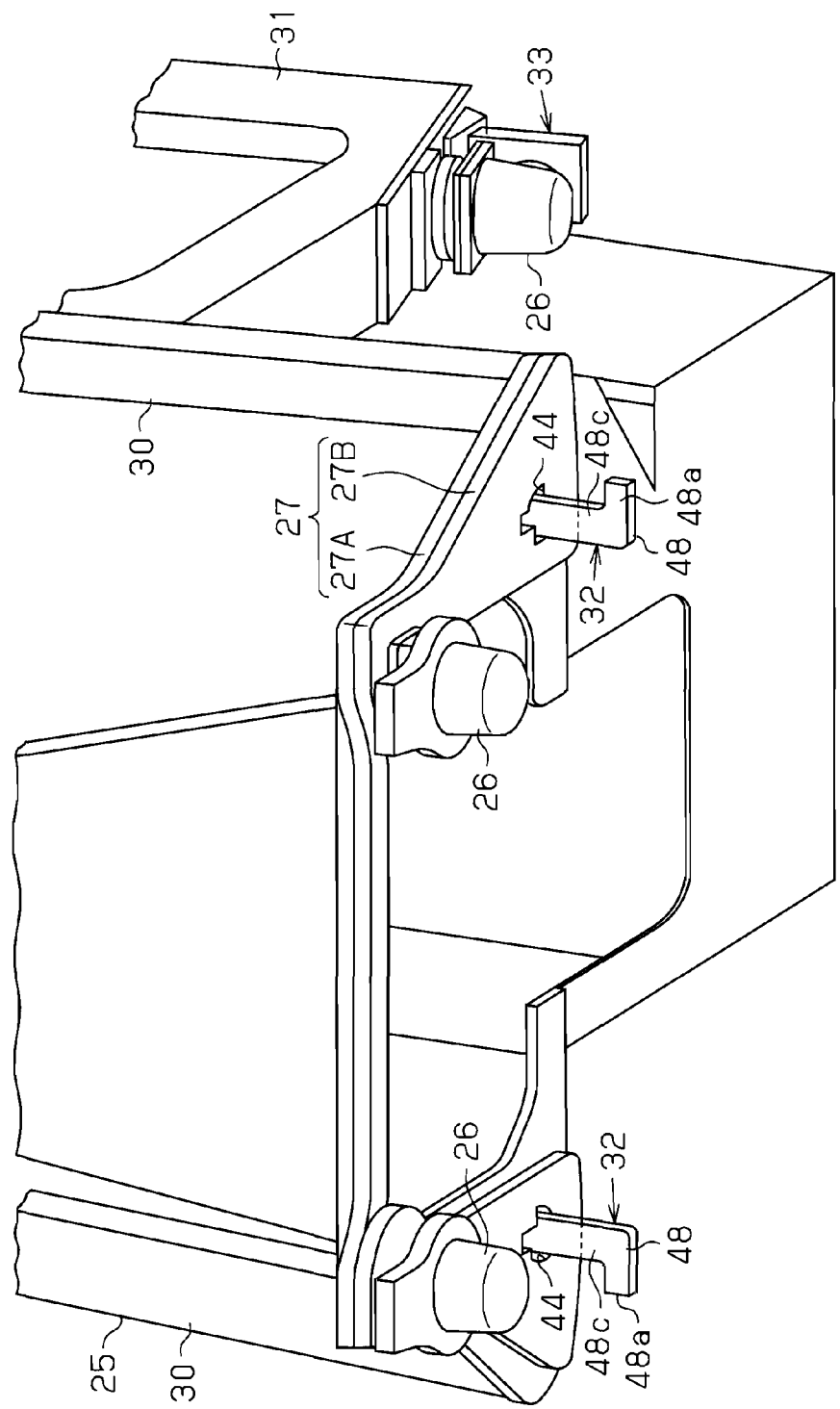
FIG. 3 is a perspective view of the essential part illustrating the front part of the cab of the bulldozer as viewed from below.

As shown in FIGS. 2 and 3, a pair of front cab stopper devices 32 are provided below the middle pillars 30 of the cab 25 on both the left and right sections. The front cab stopper devices 32 are located between the middle brackets 23 on the machine frame 21 and the floor board 27 of the cab 25. When impact load is applied to the cab 25, the front cab stopper devices 32 restrict the movement of the cab 25 within a predetermined range at the front part of the cab 25 where the sharing ratio of the impact load is low. Although the front cab stopper devices 32 restrict the movement of the cab 25 in the vertical, left-right, and front-rear directions, the front cab stopper devices 32 mainly restrict the vertical movement of the cab 25.

As shown in FIGS. 1 and 3, a pair of rear cab stopper devices 33 are provided below the rear pillars 31 of the cab 25 on both the left and right sections. The rear cab stopper devices 33 are arranged between the rear brackets 24 on the machine frame 21 and the floor plate 27 of the cab 25. When impact load is applied to the cab 25, the rear cab stopper devices 33 restrict the movement of the cab 25 in the vertical, front-rear, and left-right directions within a predetermined range at the rear part of the cab 25 where the sharing ratio of the impact load is high.

The rear cab stopper devices 33 are formed as follows.

Figure 10:
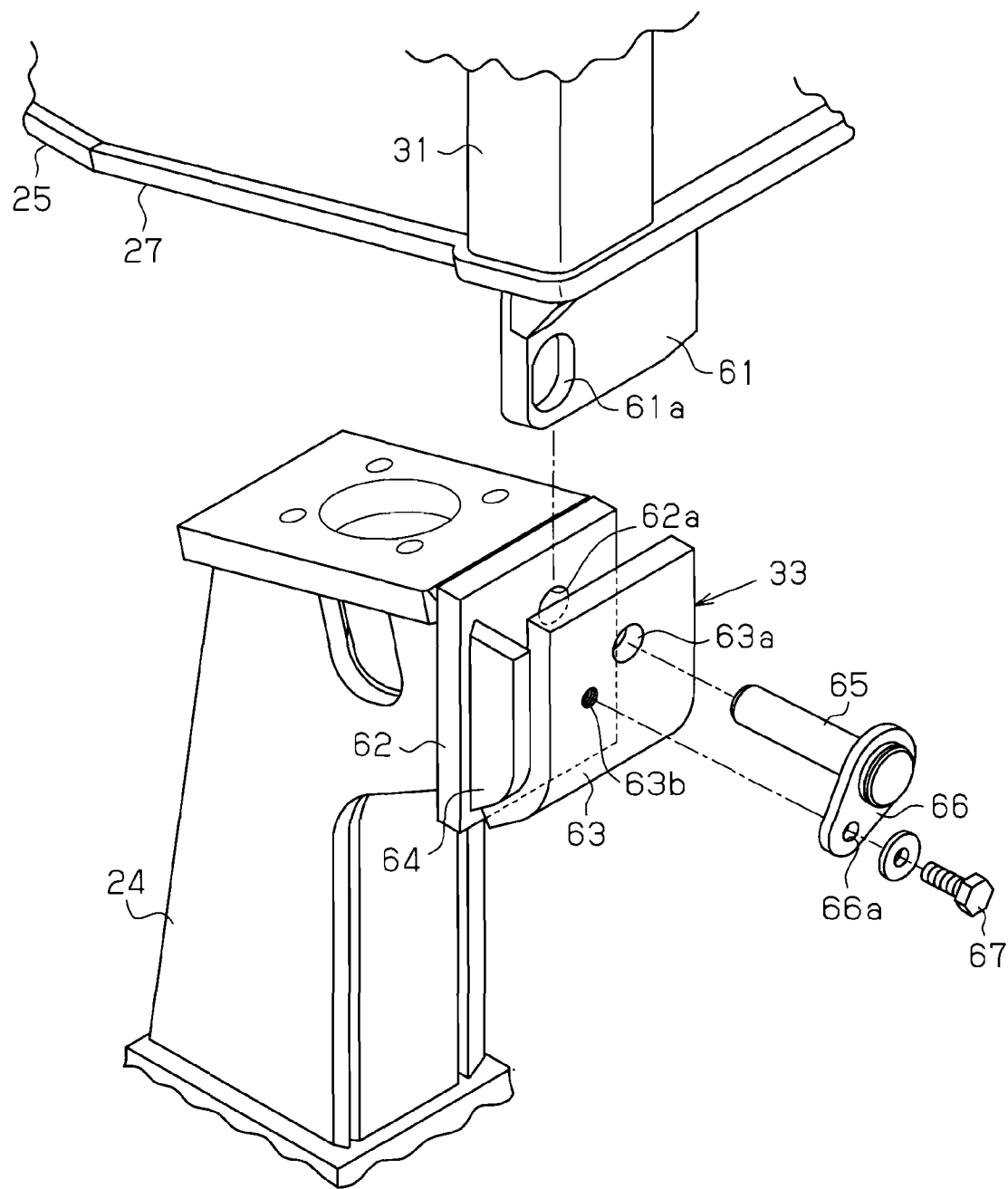
FIG. 10 is an exploded perspective view of the essential part illustrating the rear cab stopper device of FIG. 9.

A restricted member 61 is fixed to and hangs down from the lower surface of the floor plate 27 directly below each rear pillar 31 as shown in FIGS. 9 and 10. The restricted member 61 has a through hole 61a, which extends in the front-rear direction. A pair of restricting members 62, 63 made of metal plates are secured to the upper rear end of the rear bracket 24 on the machine frame 21 at a predetermined interval in the front-rear direction. The restricting members 62, 63 are arranged parallel to each other and face the front surface and the rear surface of the restricted member 61. The restricting members 62, 63 respectively have pin through holes 62a, 63a, which extend in the front-rear direction. A closing plate 64 is fixed to the restricting member 62, and the closing plate 64 is arranged on the outer side of the clearance between the restricting members 62, 63.

A metal restricting pin 65 is inserted in the pin through holes 62a, 63a of the restricting members 62, 63 and the through hole 61a of the restricted member 61 so as to be fitted to the pin through holes 62a, 63a. The middle part of the restricting pin 65 is inserted in the through hole 61a of the restricted member 61. A stopper plate 66 is secured to the proximal end of the restricting pin 65, and the stopper plate 66 has a bore 66a. The rear restricting member 63 has a threaded bore 63a. A bolt 67 is inserted in the bore 66a of the stopper plate 66 and screwed to the threaded bore 63b of the rear restricting member 63. As the bolt 67 is screwed, the restricting pin 65 is inhibited from falling out of the pin through holes 62a, 63a of the restricting members 62, 63.

As shown in FIGS. 11 and 12, clearances S4a, S4b are formed between the upper and the lower outer circumferences of the restricting pin 65 and the inner circumferential surface of the through hole 61a of the associated restricted member 61. Thus, the vertical movement of the cab 25 is restricted to be within the range of the clearances S4a, S4b. A clearance S5a is formed between the restricted member 61 and the front restricting member 62, and a clearance S5b is formed between the restricted member 61 and the rear restricting member 63. Thus, the movement of the cab 25 in the front-rear direction is restricted to be within the range of the clearances S5a, S5b. Furthermore, clearances S6a, S6b are formed between the left and the right outer circumferences of the restricting pin 65 and the inner circumferential surface of the through hole 61a of the associated restricted member 61. The movement of the cab 25 in the left-right direction is restricted to be within the range of the clearances S6a, S6b.

The structure of the front cab stopper device 32 will now be described with reference to FIGS. 2 to 8.

Figure 4:
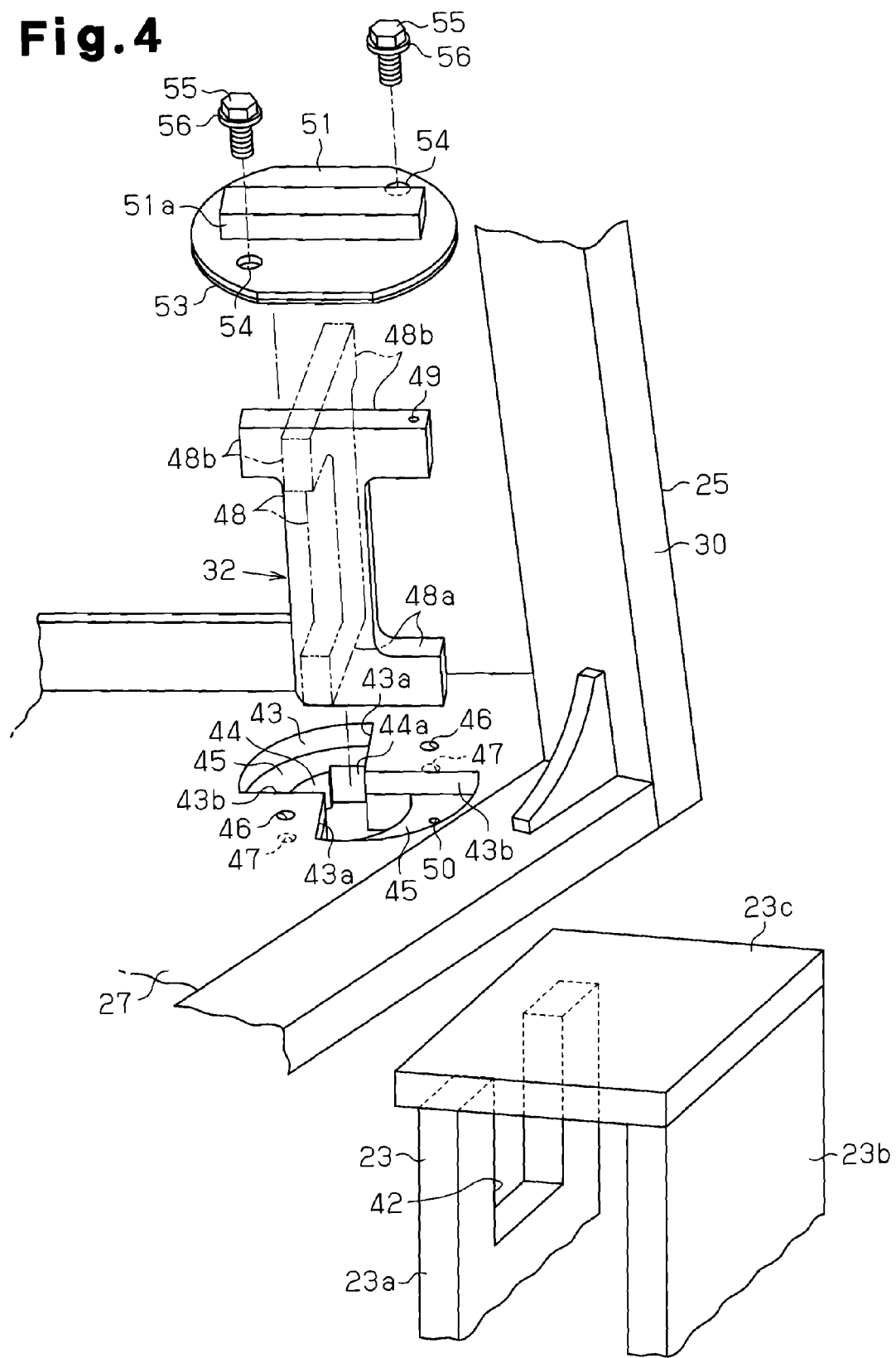
FIG. 4 is an exploded perspective view illustrating the front cab stopper device of the bulldozer.

As shown in FIGS. 2 and 4, each of the middle brackets 23 includes a pair of leg portions 23a, 23b formed of plate material and a locking plate 23c. The middle brackets 23 form part of the machine frame 21. The leg portions 23a, 23b are arranged side by side in the left-right direction, and the locking plate 23c is disposed and secured on the upper ends of the leg portions 23a, 23b. A restricting portion, which is a restricting groove 42 in this embodiment, is provided on the upper end of the leg portion 23a which is one of the leg portions 23a, 23b located on the inner side in the middle bracket 23. The upper end of the restricting groove 42 is closed by the locking plate 23c.

Figure 5:
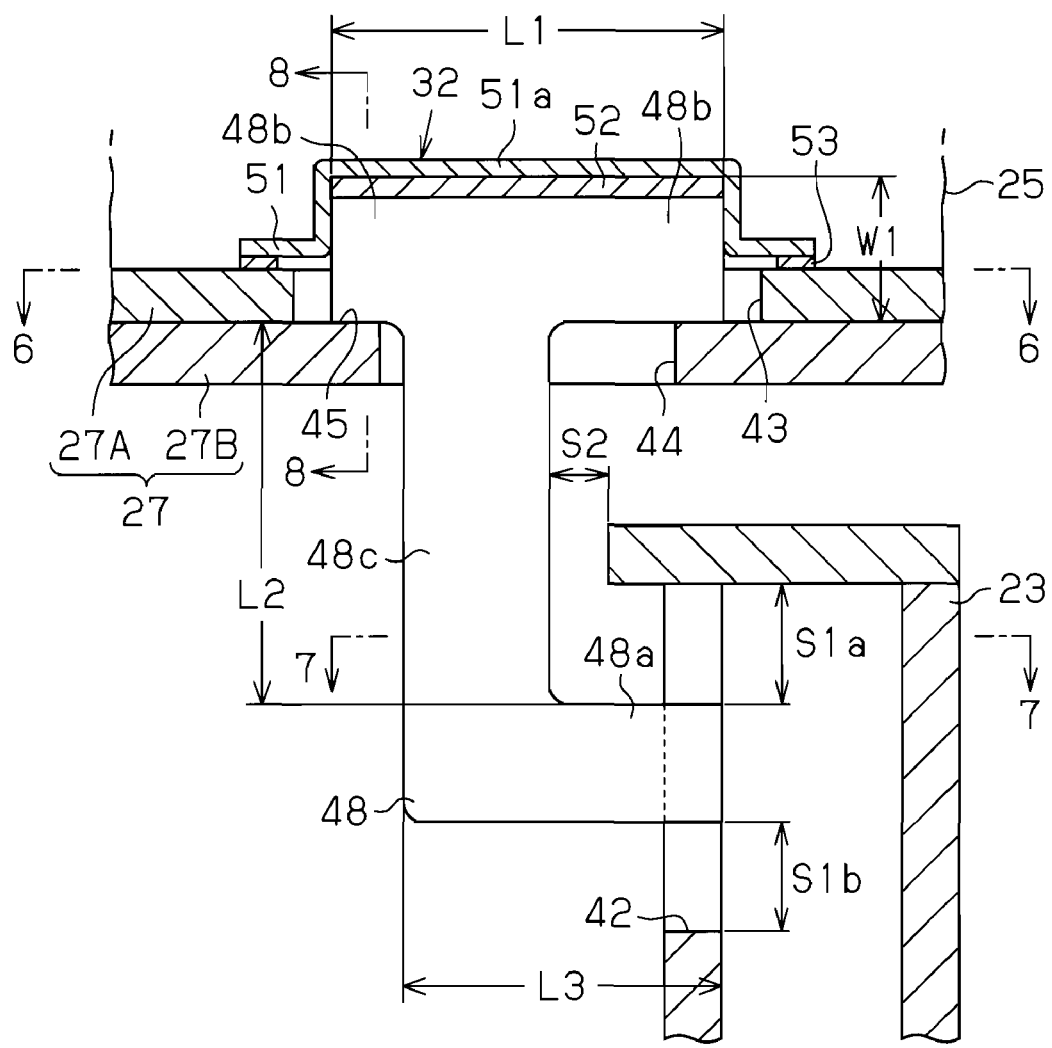
FIG. 5 is a cross-sectional view of the essential part illustrating the state where the front cab stopper device is fixed.

As shown in FIGS. 3 and 5, the floor plate 27 of the cab 25 is formed by an upper floor plate 27A and a lower floor plate 27B, which are stacked on one another. As shown in FIGS. 4, 5, and 6(a) to 6(c), through holes 43, 44 are respectively formed in the upper floor plate 27A and the lower floor plate 27B at the position corresponding to the restricting groove 42 of the middle bracket 23. The through holes 43, 44 are formed into substantially the same shape. However, the upper through hole 43 of the upper floor board 27A has an inner diameter D2 that is greater than an inner diameter D1 of the lower through hole 44 of the lower floor plate 27B. That is, the upper through hole 43 is formed to be larger than the lower through hole 44 as a whole.

As shown in FIGS. 4, 6(a), and 6(b), a pair of inserting position restricting surfaces 43a, which extend in the front-rear direction, and a pair of rotational position restricting surfaces 43b, which extend in the left-right direction, are formed in the upper through hole 43. The inserting position restricting surfaces 43a and the rotational position restricting surfaces 43b are formed alternately in the circumferential direction at intervals of 90 degrees. As shown in FIGS. 4, 6(a), and 6(c), a pair of insertion cutouts 44a are formed in the lower through hole 44 to correspond to the inserting position restricting surfaces 43a of the upper through hole 43. An inhibiting portion, which is a pair of support surfaces 45, is formed on the upper surface of the periphery of the lower through hole 44. The support surfaces 45 are adjacent to the insertion cutouts 44a of the lower through hole 44.

Figure 8:
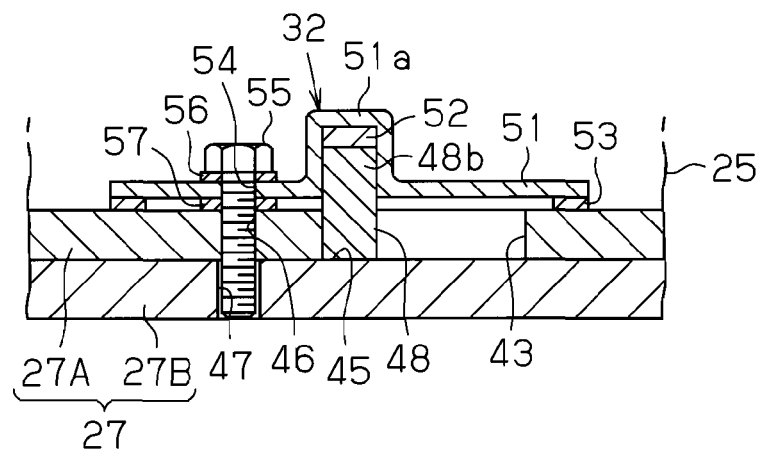
FIG. 8 is a partial cross-sectional view taken along line 8-8 of FIG. 5.

As shown in FIGS. 6(a) and 8, a pair of threaded bores 46 are formed in the upper floor plate 27A in the vicinity of the outer circumference of the upper through hole 43. A pair of bolt insertion holes 47 are formed in the lower floor plate 27B to correspond to the threaded bores 46. The bolt insertion holes 47 communicate with the threaded bores 46.

As shown in FIG. 4 and FIG. 5, the front cab stopper device 32 includes a stopper 48 formed of plate material. The stopper 48 is formed such that the upper portion is substantially T-shaped, and the lower portion is substantially L-shaped. The stopper 48 includes a vertically extending main body portion 48c, an engaging portion 48a, which is formed at the lower end of the main body portion 48c, and a securing portion 48b, which is formed at the upper end of the main body portion 48c. The engaging portion 48a projects laterally from the main body portion 48c. The securing portion 48b projects from the main body portion 48c in the same direction as and the direction opposite to the direction in which the engaging portion 48a extends. The stopper 48 is inserted in the through holes 43, 44 of the floor plates 27A, 27B of the cab 25 from above to be mounted on the floor plates 27A, 27B.

In this case, in a state in which the engaging portion 48a of the stopper 48 projects forward of the machine frame 21 as shown by the chain double-dashed lines in FIGS. 4 and 6(a), the stopper 48 is inserted along the inserting position restricting surfaces 43a of the upper through hole 43 into the insertion cutouts 44a of the lower through hole 44. At this time, the securing portion 48b is placed on the support surfaces 45. Subsequently, the stopper 48 is rotated 90 degrees about a vertically extending axis toward the rotational position restricting surfaces 43b of the upper through hole 43 such that the engaging portion 48a projects outward of the machine frame 21.

Figure 7:
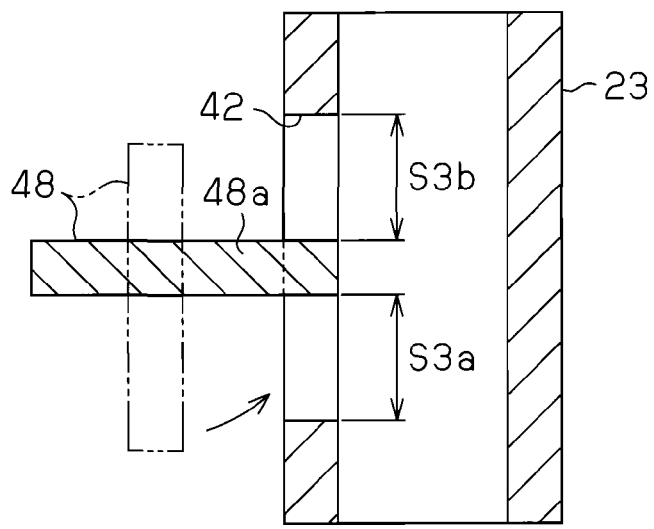
FIG. 7 is a partial cross-sectional view taken along line 7-7 of FIG. 5.

Thus, the securing portion 48b at the upper end of the stopper 48 is engaged with the rotational position restricting surfaces 43b of the upper through hole 43 as shown by the solid line in FIG. 6(a). This restricts the position of the stopper 48 in the front-rear direction. At the same time, the securing portion 48b is supported by the support surfaces 45 on the periphery of the opening of the lower through hole 44, and the downward movement of the stopper 48 is prevented. As the stopper 48 is rotated in this manner, the engaging portion 48a at the lower end of the stopper 48 is inserted in the restricting groove 42 of the middle bracket 23, and moved to a position where the engaging portion 48a is engageable with the inner circumferential surface of the restricting groove 42 as shown in FIGS. 5 and 7.

As shown in FIG. 6(b), the thickness T of the stopper 48 is set to be thinner than the width W2 of the insertion cutouts 44a. The length L1 of the securing portion 48b of the stopper 48 is shorter than the inner diameter D2 of the upper through hole 43, and is longer than the length L4 between the insertion cutouts 44a (between the inner ends) and the inner diameter D1 of the lower through hole 44. As shown in FIG. 5, the vertical width W1 of the securing portion 48b is set such that when the securing portion 48b is engaged with the support surfaces 45 of the upper surface of the lower floor plate 27B, the securing portion 48b projects upward from the upper surface of the upper floor plate 27A. The length L2 of the main body portion 48c of the stopper 48 is set such that when the securing portion 48b is engaged with the support surfaces 45 of the lower floor plate 27B, the engaging portion 48a is located at the vertically middle portion of the restricting groove 42. The length L3 of the engaging portion 48a of the stopper 48 is set such that the engaging portion 48a is inserted in the restricting groove 42 of the engaging portion 48a in a state where the main body portion 48c is inserted in the lower through hole 44. Furthermore, the length L3 of the engaging portion 48a is set shorter than the length L4 between the insertion cutouts 44a so that the stopper 48 can vertically pass between the insertion cutouts 44a facing each other.

As shown in FIG. 5, a clearance S1a is formed between the upper edge of the engaging portion 48a of the stopper 48 and the upper end portion of the restricting groove 42 of the middle bracket 23. A clearance S1b is formed between the lower edge of the engaging portion 48a and the lower end portion of the restricting groove 42. A clearance S2 is formed between the outer edge of the main body portion 48c of the stopper 48 and the inner edge of the upper end of the middle bracket 23. As shown in FIG. 7, a clearance S1a is formed between the front surface of the engaging portion 48a of the stopper 48 and the front end portion of the restricting groove 42 of the middle bracket 23, and a clearance S1b is formed between the rear surface of the engaging portion 48a and the rear end portion of the restricting groove 42. The movement of the cab 25 relative to the machine frame 21 in the vertical, outward, and front-rear direction is restricted within the range of the clearances S1a, S1b, S2, S3a, S1b.

As shown in FIGS. 4 and 6, marks 49 and 50 are respectively provided on the upper surface of one end of the securing portion 48b and the support surface 45 on the periphery of the opening of the lower through hole 44. The marks 49, 50 match with each other when the mounting direction of the engaging portion 48a of the stopper 48 is correct. The stopper 48 is prevented from being mounted on the floor plates 27A, 27B in an incorrect direction, that is, the engaging portion 48a of the stopper 48 is prevented from being mounted in the incorrect direction by inserting the stopper 48 in the through holes 43, 44 so as to match the marks 49, 50.

As shown in FIGS. 4 to 6, the front cab stopper device 32 includes a cover plate 51 made of plate material. The cover plate 51 is substantially oval in shape. A groove-like cover 51a, which opens downward, is formed at the center of the cover plate 51. The cap portion 51a is formed by press drawing. Shock absorbing means, which is a sheet-like elastic material 52 in this embodiment, is secured to the inner upper surface of the cap portion 51a. Sealing means, which is an annular packing 53 in this embodiment, is mounted on the periphery of the lower surface of the cover plate 51. The packing 53 seals between the cover plate 51 and the floor plate 27. A pair of bolt through holes 54 is formed in the cover plate 51 on both sides of the cap portion 51a. The cap portion 51a of the cover plate 51 covers the securing portion 48b of the stopper 48 and is fitted to the securing portion 48b in a state where the stopper 48 is inserted and fixed in the through holes 43, 44. In this state, bolts 55 are inserted in the through holes 54, and are screwed to the threaded bores 46 of the upper floor plate 27A with a pair of washers 56, 57. Accordingly, the cover plate 51 is secured to the upper floor cover 27A.

Since the cap portion 51a of the cover plate 51 presses the securing portion 48b of the stopper 48 against the support surfaces 45 with the elastic material 52 in between, upward movement of the stopper 48 is prevented. In this state, the packing 53 on the periphery of the cover plate 51 is press-fitted to the upper surface of the upper floor plate 27A as shown in FIGS. 5 and 8.

The operation of the bulldozer formed as described above will now be described.

If vibrations or impact are applied to the machine frame 21 when the bulldozer is travelling, the stud 38 of each damper 26 moves relative to the case 36 in the vertical, front-rear, and left-right directions. The relative movement causes the shock absorbing member 40 to elastically deform. Accordingly, non-illustrated damping liquid flows, and flow resistance of the damping liquid is generated. Such elastic deformation and flow resistance operate together to damp and moderate the vibrations and impact transmitted to the cab 25 in advance. This ensures a comfortable ride in the cab 25.

If the bulldozer rolls over and excessive impact load is applied to the cab 25, the cab 25 moves relative to the machine frame 21. At this time, the impact load is shared and received by the rear cab stopper device 33 and the front cab stopper device 32. More specifically, since the ratio of the impact load borne by the rear part is higher as compared to the front part of the cab 25, the rear part of the cab 25 is moved in the vertical, front-rear, and left-right directions by a larger amount. However, the rear cab stopper device 33 restricts the movement of the rear part of the cab 25 in the vertical, front-rear, and left-right directions within a predetermined range. Since the ratio of the impact load borne by the front part of the cab 25 is low, and the bulldozer rarely rolls over to the front side, only slight vertical impact load is generally applied to the front part of the cab 25. The vertical movement of the front part of the cab 25 is restricted within a predetermined range by the front cab stopper device 32. The front cab stopper device 32, of course, also functions as to restrict the left-right and front-rear movement of the cab 25 within a predetermined range.

Thus, the rear cab stopper device 33 and the front cab stopper device 32 reduce excessive movement of the cab 25 with respect to the machine frame 21, thereby protecting an operator in the cab 25. The dampers 26 are designed to restrict the movement of the cab 25 in the vertical, front-rear, and left-right directions by a certain range. However, if the dampers are designed to endure the excessive impact load in those directions, the size of the dampers is undesirably increased. This causes problems in the arrangement and the manufacturing costs of the dampers. Therefore, the dampers 26 of the present embodiment are not designed to restrict the movement range of the cab 25 by a level that endures excessive impact load.

Subsequently, a method for fixing the front cab stopper device 32, which is the main structure of the present embodiment, will now be described.

When fixing the front cab stopper device 32, the stopper 48 is inserted in the through holes 43, 44 from above the floor plate 27 of the cab 25 through the insertion cutouts 44a while the engaging portion 48a at the lower end of the stopper 48 projects forward as shown by the chain double-dashed lines in FIGS. 4 and 6(a) to 6(c). At this time, the relative position of the stopper 48 and the through holes 43, 44 corresponds to an inserting position where the stopper 48 is insertable in the through holes 43, 44 in a state in which the engaging portion 48a of the stopper 48 does not contact the middle bracket 23, which includes the restricting groove 42. With the stopper 48 inserted in the through holes 43, 44, the stopper 48 is rotated 90 degrees about the vertically extending axis such that the engaging portion 48a of the stopper 48 projects toward the outside of the machine frame 21. Accordingly, the securing portion 48b of the stopper 48 is supported on the support surfaces 45 on the periphery of the opening of the lower through hole 44 as shown by the solid line in FIG. 6(a). This prevents the downward movement of the stopper 48. Furthermore, when the stopper 48 is rotated, the engaging portion 48a at the lower end of the stopper 48 is inserted in the restricting groove 42 of the middle bracket 23, and moved to the position where the engaging portion 48a is engageable with the inner circumferential surface of the restricting groove 42 and the locking plate 23c at the upper end of the middle bracket 23 as shown in FIGS. 5 and 7. That is, the relative position of the stopper 48 and the through holes 43, 44 corresponds to an engaging position where the engaging portion 48a is engageable with the restricting groove 42.

In this case, the pair of marks 49, 50 is correspondingly provided on the stopper 48 and one of the support surfaces 45 as shown in FIGS. 4 and 6. The stopper 48 is prevented from being mounted in an incorrect direction by inserting and fixing the stopper 48 in the through holes 43, 44 to match the marks 49, 50.

Subsequently, the cover plate 51 is placed on the upper surface of the upper floor plate 27A, and the securing portion 48b of the stopper 48 is covered by the cap portion 51a of the cover plate 51 and fitted to the cover 51a. In this state, the bolts 55 are inserted in the bolt through holes 54 of the cover plate 51, and screwed to the threaded bores 46 of the upper floor plate 27A with the washers 56, 57. Accordingly, the cover plate 51 is fastened to the upper floor plate 27A. As a result, the cap portion 51a of the cover plate 51 presses the securing portion 48b of the stopper 48 against the support surfaces 45 with the elastic material 52 in between as shown in FIGS. 5 and 8, and prevents the upward movement of the stopper 48. The elastic material 52, which functions as a shock absorber, inhibits generation of vibration and noise between the stopper 48 and the cover plate 51. At this time, the packing 53 at the periphery of the cover plate 51 is press-fitted to the upper surface of the upper floor plate 27A. This inhibits air, noise, or water such as rainwater outside the cab 25 from entering the cab 25 through the through holes 43, 44.

As described above, according to the front cab stopper device 32 of the present embodiment, the stopper 48 is fixed by a simple operation. More specifically, the stopper 48 is inserted and fixed in the through holes 43, 44 of the floor plate 27 of the cab 25 from above, and the cover plate 51 is then mounted on the floor plate 27 to cover the stopper 48. Thus, even if a working space is not easily secured between the machine frame 21 and the cab 25 due to various devices that are installed in the vicinity of the front cab stopper device 32 at the upper part of the machine frame 21, the stopper 48 is easily fixed from above the floor plate 27 of the cab 25.

In the front cab stopper device 32 of the present embodiment, the restricting groove 42 is formed in the middle bracket 23 made of plate material on the machine frame 21. The securing portion 48b and the engaging portion 48a are also provided on both vertical ends of the stopper 48 made of plate material. Therefore, the leg portions 23a, 23b of the middle bracket 23, the locking plate 23c, and the stopper 48 are formed by a simple operation, that is, by thermal cutting a metal plate. The cover plate 51 is formed by subjecting a metal plate to laser thermal cutting, and forming the cover 51a by press drawing. Thus, manufacture of the cab stopper device is easy, and the number of components of the cab stopper device is reduced. The elastic material 52 is located between the cover plate 51 and the stopper 48, and the packing 53 is located between the cover plate 51 and the floor plate 27. Thus, even if a slight dimensional error occurs during processing of the stopper 48 and the cover plate 51, the dimensional error is absorbed by the deformation of the elastic material 52 and the packing 53. This further facilitates processing of the stopper 48 and the cover plate 51.

As described above, the device of the present invention is easy to form and fix, and has small number of components, which significantly reduces the manufacturing costs.

MODIFIED EMBODIMENT

The present embodiment may be modified as follows.

In the above embodiment, the stopper 48 is arranged at the engaging position by being rotated 90 degrees about the vertically extending axis from the position where the stopper 48 is inserted in the through holes 43, 44 of the floor plate 27 of the cab 25. However, the stopper 48 may be moved laterally after being inserted in the through holes 43, 44 to be arranged at the engaging position. As another embodiment, the through holes 43, 44 may have a rectangular cross-section. In this case, the stopper 48 is inserted in the through holes 43, 44 from one end such that the stopper 48 does not contact the restricting portion, and then engageable with the restricting groove 42 on the other end of the through holes 43, 44.

In the above embodiment, the middle brackets 23, which are engageable with the stoppers 48, are provided. However, the middle brackets 23 may be omitted, and the stoppers 48 may be directly engaged with the machine frame 21.

In the above embodiment, the present invention is embodied in the front cab stopper device of the bulldozer, but may be applied to other cab stopper devices for work machines such as the rear cab stopper device of the bulldozer, a hydraulic shovel, a loader, and an off-road dump truck.

In the above embodiment, the elastic material 52 is arranged between the stopper 48 and the cover plate 51. For example, the elastic material 52 may be omitted when vibration and noise generated between the stopper 48 and the cover plate 51 can be ignored.

In the above embodiment, the sealing means, which is the annular packing 53, is located between the cover plate 51 and the floor plate 27. For example, the sealing means may be omitted when the amount of air or rainwater that enters the cab 25 via the through holes 43, 44 is negligible.

In the above embodiment, the marks 49, 50 for preventing the stopper 48 from being mounted in an incorrect direction are provided. For example, the marks 49, 50 may be omitted when the possibility of mounting the stopper 48 in an incorrect direction is very low.

The invention claimed is:

1. A cab stopper device provided between a restricting portion provided on a machine frame of a work machine and a cab of the work machine, said cab stopper device comprising:
    a through hole formed in a floor plate of the cab; and
    a stopper, which is inserted in the through hole from above, the stopper including an engaging portion at its lower end that projects downward from the through hole, the engaging portion being engageable with the restricting portion,
    wherein the relative position of the through hole and the stopper is changeable between an inserting position, at which the stopper is insertable in the through hole with the engaging portion not contacting the restricting portion, and an engaging position, at which the engaging portion is engageable with the restricting portion with the stopper inserted in the through hole,
    wherein the floor plate has an inhibiting portion for inhibiting the stopper located at the engaging position from moving downward, and
    wherein, when the stopper is rotated about the vertically extending axis after being inserted in the through hole, the inhibiting portion inhibits the stopper from moving downward.

2. The cab stopper device according to claim 1, wherein the upper end portion of the stopper is fixed on the upper surface of the floor plate in a state where the relative position of the through hole and the stopper corresponds to the engaging position.

3. The cab stopper device according to claim 1, wherein when the stopper is rotated about a vertically extending axis after being inserted in the through hole, the relative position between the through hole and the stopper is shifted from the inserting position to the engaging position.

4. The cab stopper device according to claim 2, wherein the floor plate and the stopper are respectively provided with marks, which match each other when the direction in which the stopper is mounted with respect to the floor plate is correct.

5. The cab stopper device according to claim 1, wherein the stopper is formed of plate material.

6. The cab stopper device according to claim 1 is located between the cab and a restricting portion provided on the machine frame, said cab comprising:
    the floor plate which is arranged at the lower part of the cab, and
    the inhibiting portion for inhibiting the stopper located at the engaging position from moving downward located proximate the through hole.

7. The cab stopper device according to claim 6, wherein a cover plate is secured to the floor plate in a state where the cover plate covers the upper end portion of the stopper, the cover plate inhibits the movement of the stopper in a state where the relative position between the through hole and the stopper is at the engaging position.

* * * * *